US012412373B2

(12) United States Patent
Ehteshami Bejnordi et al.

(10) Patent No.: US 12,412,373 B2
(45) Date of Patent: Sep. 9, 2025

(54) SALIENCY-BASED INPUT RESAMPLING FOR EFFICIENT OBJECT DETECTION

(71) Applicant: QUALCOMM Incorporated, San Diego, CA (US)

(72) Inventors: Babak Ehteshami Bejnordi, Amsterdam (NL); Amir Ghodrati, Amsterdam (NL); Fatih Murat Porikli, San Diego, CA (US); Amirhossein Habibian, Amsterdam (NL)

(73) Assignee: QUALCOMM Incorporated, San Diego, CA (US)

( * ) Notice: Subject to any disclaimer, the term of this patent is extended or adjusted under 35 U.S.C. 154(b) by 326 days.

(21) Appl. No.: 17/973,370

(22) Filed: Oct. 25, 2022

(65) Prior Publication Data

US 2023/0154157 A1 May 18, 2023

Related U.S. Application Data

(60) Provisional application No. 63/280,104, filed on Nov. 16, 2021.

(51) Int. Cl.
G06V 10/77 (2022.01)
G06V 10/22 (2022.01)
G06V 10/46 (2022.01)
G06V 10/82 (2022.01)

(52) U.S. Cl.
CPC ........ *G06V 10/7715* (2022.01); *G06V 10/225* (2022.01); *G06V 10/462* (2022.01); *G06V 10/82* (2022.01)

(58) Field of Classification Search
CPC .. G06V 10/7715; G06V 10/462; G06V 10/82; G06V 10/225
USPC ........................................................ 382/156
See application file for complete search history.

(56) References Cited

U.S. PATENT DOCUMENTS

2017/0262996 A1\* 9/2017 Jain ..................... G06V 10/462
2020/0074589 A1 3/2020 Stent et al.

OTHER PUBLICATIONS

International Search Report and Written Opinion—PCT/US2022/047920—ISA/EPO—Feb. 17, 2023.
Thavamani T., et al., "FOVEA: Foveated Image Magnification for Autonomous Navigation", arxiv.org, Cornell University Library, 201 Olin Library Cornell University Ithaca, NY, 14853, Aug. 27, 2021, 16 Pages.

\* cited by examiner

*Primary Examiner* — Michael R Neff
(74) *Attorney, Agent, or Firm* — QUALCOMM Incorporated

(57) ABSTRACT

A processor-implemented method of video processing using includes receiving, via an artificial neural network (ANN), a video including a first frame and a second frame. A saliency map is generated based on the first frame of the video. The second frame of the video is sampled based on the saliency map. A first portion of the second frame is sampled at a first resolution and a second portion of the second frame is sampled at a second resolution. The first resolution is different than the second resolution. A resampled second frame is generated based on the sampling of the second frame. The resampled second frame is processed to determine an inference associated with the video.

18 Claims, 10 Drawing Sheets

SALIENCY-BASED INPUT RESAMPLING FOR EFFICIENT OBJECT DETECTION

CROSS-REFERENCE TO RELATED APPLICATION

The present application claims the benefit of U.S. Provisional Patent Application No. 63/280,104, filed on Nov. 16, 2021, and titled "SALIENCY-BASED INPUT RESAMPLING FOR EFFICIENT OBJECT DETECTION," the disclosure of which is expressly incorporated by reference in its entirety.

FIELD OF DISCLOSURE

Aspects of the present disclosure generally relate to video processing via an artificial neural network.

BACKGROUND

Artificial neural networks may comprise interconnected groups of artificial neurons (e.g., neuron models). The artificial neural network may be a computational device or represented as a method to be performed by a computational device.

Neural networks consist of operands that consume tensors and produce tensors. Neural networks can be used to solve complex problems, however, because the network size and the number of computations that may be performed to produce the solution may be voluminous, the time for the network to complete a task may be long. Furthermore, because these tasks may be performed on mobile devices, which may have limited computational power, the computational costs of deep neural networks may be problematic.

Convolutional neural networks are a type of feed-forward artificial neural network. Convolutional neural networks may include collections of neurons that each have a receptive field and that collectively tile an input space. Convolutional neural networks (CNNs), such as deep convolutional neural networks (DCNs), have numerous applications. In particular, these neural network architectures are used in various technologies, such as image recognition, pattern recognition, speech recognition, autonomous driving, and other classification tasks.

Neural networks also have numerous applications in image-based processing of videos or video streams such as human pose estimation, object detection, semantic segmentation, as well as video compression and de-noising. Unfortunately, such video processing is computationally intensive, which may result in significant processing time as well as increased memory costs and power consumption.

These challenges may be exacerbated when neural networks are deployed on devices with limited computational and power resources. Many current implementations of such neural networks for mission-critical systems such as autonomous driving and video surveillance, for example, may only be optimized for task accuracy and may not take the computational cost, or run-time, on device into account.

Additionally, the advent of 4K camera technology presents new opportunities by enabling the discovery of more detailed content in a scene, which may enable increased detection and classification accuracy, but may also pose more significant challenges for computational resources to process the more detailed content.

SUMMARY

The present disclosure is set forth in the independent claims, respectively. Some aspects of the disclosure are described in the dependent claims.

In aspects of the present disclosure, a processor-implemented method of video processing using an artificial neural network (ANN) includes receiving a video including a first frame and a second frame. The method also includes generating a saliency map based on the first frame of the video. The method further includes sampling the second frame of the video based on the saliency map. A first portion of the second frame is sampled at a first resolution and a second portion of the second frame is sampled at a second resolution. The first resolution is different than the second resolution. The method additionally includes generating a resampled second frame based on the sampling. The method still further includes processing the resampled second frame to determine an inference associated with the video.

In other aspects of the present disclosure, an apparatus for video processing using an artificial neural network (ANN) is presented. The apparatus has a memory and one or more processor(s) coupled to the memory. The processor(s) are configured to receive a video including a first frame and a second frame. The processor(s) are also configured to generate a saliency map based on the first frame of the video. The processor(s) are further configured to sample the second frame of the video based on the saliency map. A first portion of the second frame is sampled at a first resolution and a second portion of the second frame is sampled at a second resolution. The first resolution is different than the second resolution. The processor(s) are additionally configured to generate a resampled second frame based on the sampling. The processor(s) are further configured to process the resampled second frame to determine an inference associated with the video.

In other aspects of the present disclosure, a non-transitory computer-readable medium is disclosed. The non-transitory computer readable medium has program code for video processing using an artificial neural network. The program code is executed by a processor and includes program code to receive a video including a first frame and a second frame. The program code also includes program code to generate a saliency map based on the first frame of the video. The program code further includes program code to sample the second frame of the video based on the saliency map. A first portion of the second frame is sampled at a first resolution and a second portion of the second frame is sampled at a second resolution. The first resolution is different than the second resolution. The program code additionally includes program code to generate a resampled second frame based on the sampling. Furthermore, the program code includes program code to process the resampled second frame to determine an inference associated with the video.

In still other aspects of the present disclosure, an apparatus for video processing using an artificial neural network (ANN) is presented. The apparatus includes means for receiving a video including a first frame and a second frame. The apparatus also includes means for generating a saliency map based on the first frame of the video. The apparatus further includes means for sampling the second frame of the video based on the saliency map. A first portion of the second frame is sampled at a first resolution and a second portion of the second frame is sampled at a second resolution. The first resolution is different than the second resolution. The apparatus additionally includes means for generating a resampled second frame based on the sampling. The apparatus further includes means for processing the resampled second frame to determine an inference associated with the video.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
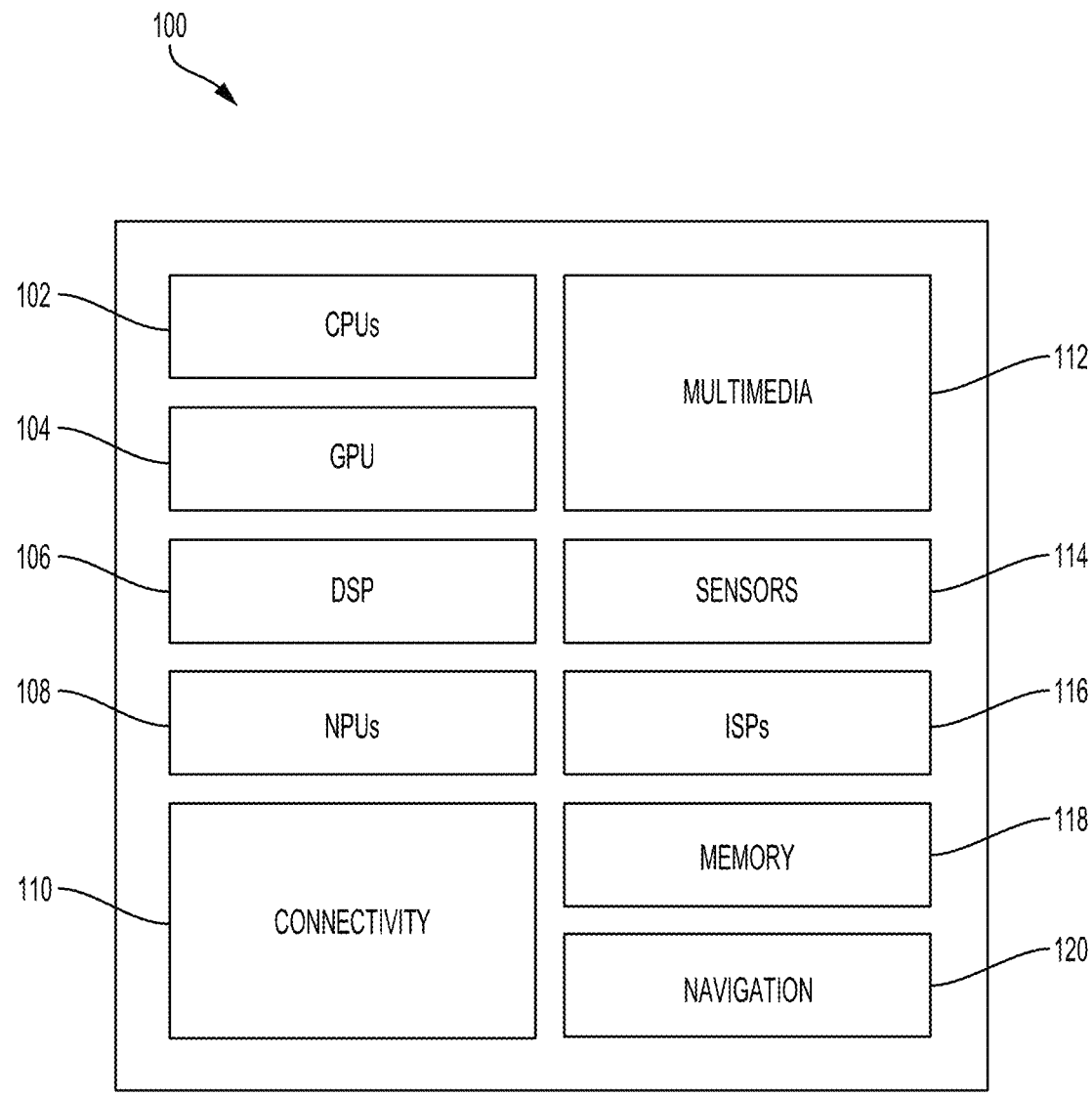
FIG. 1 illustrates an example implementation of a neural network using a system-on-a-chip (SoC), including a general-purpose processor, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used to mean "serving as an example, instance, or illustration." Any aspect described as "exemplary" is not necessarily to be construed as preferred or advantageous over other aspects.

Although particular aspects are described, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

As described, neural networks have numerous applications in image-based processing of videos or video streams such as human pose estimation, object detection, semantic segmentation, as well as video compression and de-noising. Unfortunately, such video processing is computationally intensive, which results in significant time and energy consumption.

Moreover, the rise in the quality of image capturing devices such as 4K (4K refers to a horizontal display resolution of approximately 4000 pixels) cameras has enabled artificial intelligence (AI) solutions to discover more detailed video content and is, therefore, widely adopted for high-performance object detection in videos. However, the increase in the recognition performance (e.g., accuracy), resulting from this higher resolution signal, may come with the cost of increased computation. This limits the application of state-of-the-art video object detectors on resource-constrained devices. Some conventional approaches may naively down-sample the input to reduce computation costs, however, such conventional approaches degrade detection performance.

Some conventional approaches may involve interleaving heavy and light feature extractors, limiting the computation to a local window, or extrapolating features from a key frame to subsequent frames using a light optical flow predictor. However, these conventional approaches may suffer from feature misalignment resulting from two different feature extractors or inefficiency in handling frequent global scene changes.

To address these and other challenges, aspects of the present disclosure are directed to non-uniform input sampling that retains fine-grained details of a high-resolution image while allowing for heavy down-sampling of unimportant or less important background regions. For instance, in some aspects, saliency-based input resampling may be employed for efficient object detection. Furthermore, aspects of the present disclosure may be beneficially applied in numerous real-world applications such as autonomous driving, augmented reality, and video surveillance, for example.

FIG. 1 illustrates an example implementation of a system-on-a-chip (SoC) 100, which may include a central processing unit (CPU) 102 or a multi-core CPU configured for processing a video with an artificial neural network (e.g., a neural end-to-end network). Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SoC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU 108 is implemented in the CPU 102, DSP 106, and/or GPU 104. The SoC 100 may also include a sensor processor 114, image signal processors (ISPs) 116, and/or navigation module 120, which may include a global positioning system.

The SoC 100 may be based on an ARM instruction set. In an aspect of the present disclosure, the instructions loaded into the general-purpose processor 102 may include code to receive a video including a first frame and a second frame. The general-purpose processor 102 may also include code to generate a saliency map based on the first frame of the video. The general-purpose processor 102 may additionally include code to sample the second frame of the video based on the saliency map. A first portion of the second frame is sampled at a first resolution and a second portion of the second frame is sampled at a second resolution. The first resolution is different than the second resolution. The general-purpose processor 102 may also include code to generate a resampled second frame based on the sampling of the second frame. The general-purpose processor 102 may also include code to process the resampled second frame to determine an inference associated with the video.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
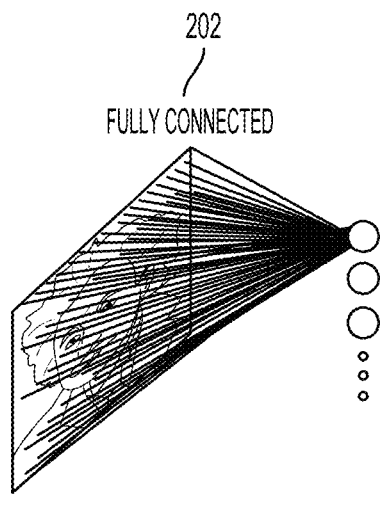
FIGS. 2A, 2B, and 2C are diagrams illustrating a neural network, in accordance with aspects of the present disclosure.
Figure 2B:
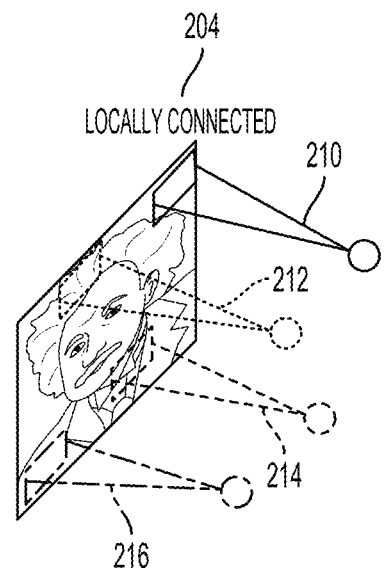

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer because the higher layer neurons in a given region may receive inputs that are tuned through training to the properties of a restricted portion of the total input to the network.

Figure 2C:
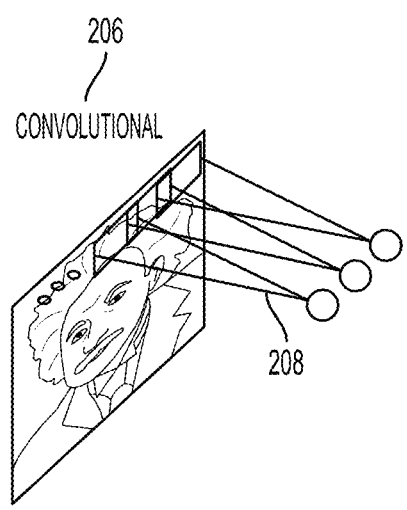

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
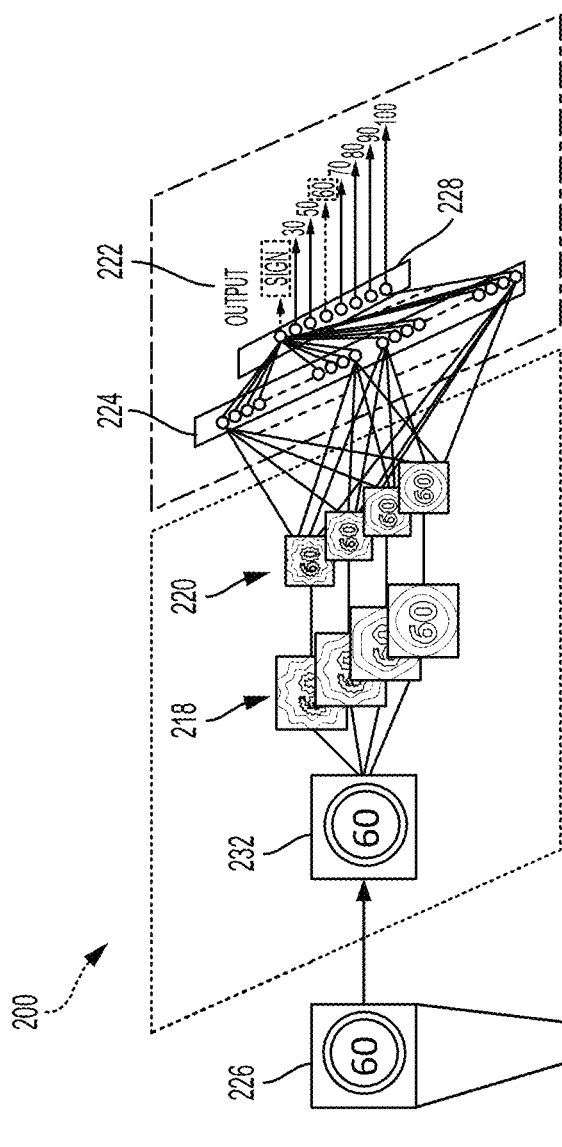
FIG. 2D is a diagram illustrating an exemplary deep convolutional network (DCN), in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 may be a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 may likely be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN 200 may be presented with new images and a forward pass through the DCN 200 may yield an output 222 that may be considered an inference or a prediction of the DCN 200.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

DCNs are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feedforward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down-sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
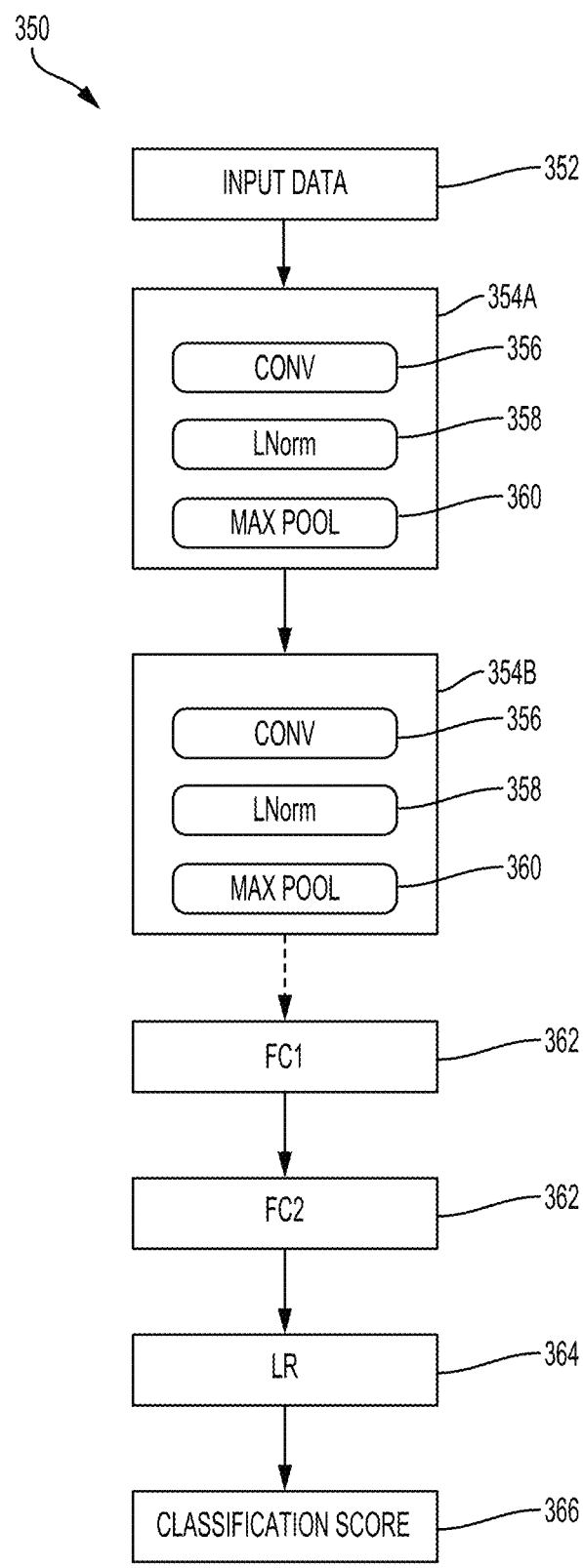
FIG. 3 is a block diagram illustrating an exemplary deep convolutional network (DCN), in accordance with aspects of the present disclosure.

FIG. 3 is a block diagram illustrating a deep convolutional network (DCN) 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360. Although only two of the convolution blocks 354A, 354B are shown, the present disclosure is not so limiting, and instead, any number of the convolution blocks 354A, 354B may be included in the deep convolutional network 350 according to design preference.

The convolution layers 356 may include one or more convolutional filters, which may be applied to the input data to generate a feature map. The normalization layer 358 may normalize the output of the convolution filters. For example, the normalization layer 358 may provide whitening or lateral inhibition. The max pooling layers 360 may provide down-sampling aggregation over space for local invariance and dimensionality reduction.

The parallel filter banks, for example, of a deep convolutional network may be loaded on a CPU 102 or GPU 104 of an SoC 100 (e.g., FIG. 1) to achieve high performance and low power consumption. In alternative embodiments, the parallel filter banks may be loaded on the DSP 106 or an ISP 116 of an SoC 100. In addition, the deep convolutional network 350 may access other processing blocks that may be present on the SoC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
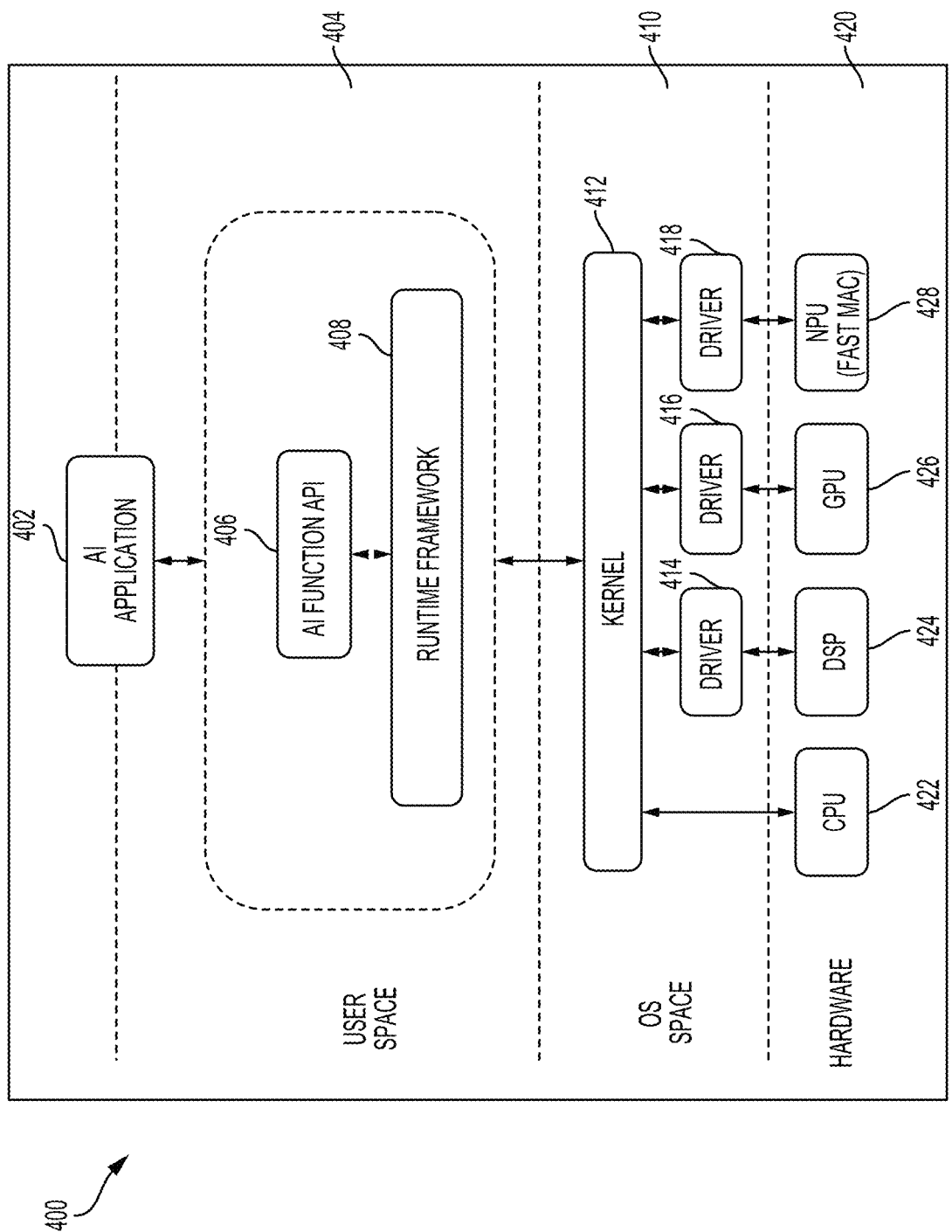
FIG. 4 is a block diagram illustrating an exemplary software architecture that may modularize artificial intelligence (AI) functions.

FIG. 4 is a block diagram illustrating an exemplary software architecture 400 that may modularize artificial intelligence (AI) functions. Using the architecture 400, applications may be designed that may cause various processing blocks of a system-on-a-chip (SoC) 420 (for example a CPU 422, a DSP 424, a GPU 426 and/or an NPU 428) (which may be similar to the SoC 100 of FIG. 1) to support adaptive rounding as disclosed for post-training quantization for an AI application 402, according to aspects of the present disclosure.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in an AI function application programming interface (API), such as a SceneDetect API 406 to provide an estimate of the current scene. This request may ultimately rely on the output of a deep neural network configured to provide an inference response based on video and positioning data, for example. The deep neural network may be a differential neural network configured to provide scene estimates based on video and positioning data, for example A run-time engine 408, which may be compiled code of a runtime framework, may be further accessible to the AI application 402. The AI application 402 may cause the run-time engine 408, for example, to request an inference, such as a scene estimate, at a particular time interval or triggered by an event detected by the user interface of the application 402. When caused to provide an inference response (e.g., to estimate the scene), the run-time engine 408 may in turn send a signal to an operating system in an operating system (OS) space, such as a Linux Kernel 412, running on the SoC 420. The operating system, in turn, may cause a continuous relaxation of quantization to be performed on the CPU 422, the DSP 424, the GPU 426, the NPU 428, or some combination thereof. The CPU 422 may be accessed directly by the operating system, and other processing blocks may be accessed through a driver, such as a driver 414, 416, or 418 for, respectively, the DSP 424, the GPU 426, or the NPU 428. In the exemplary example, the deep neural network may be configured to run on a combination of processing blocks, such as the CPU 422, the DSP 424, and the GPU 426, or may be run on the NPU 428.

Aspects of the present disclosure are directed to saliency-based input resampling. That is, an input such as an image or a video may be sampled such that more salient portions of the input may be sampled at a higher resolution than less salient portions of the input. The resulting detail-preserved image may be spatially smaller, leading to reduced computational cost while enabling performance that may be comparable to a high-resolution input.

In accordance with aspects of the present disclosure, given a set of high-resolution video frames and corresponding labels $\{f_i, y_i\}_{i=1}^{N}$, a bounding box may be detected and a category or classification of one or more objects in each frame may be determined.

A framework for saliency-based input resampling may include: i) object detection models $\mathcal{D}_1$ and $\mathcal{D}_2$, where FLOPs$\mathcal{D}_2$ <<FLOPs$\mathcal{D}_1$ (where FLOPs are floating point operations per second), ii) a saliency map generator, iii) a resampling module, and iv) an inverse transformation module. At inference, in a first step, a first high-resolution frame $f_t$ (key frame) may be supplied to the object detection model $\mathcal{D}_1$ (higher performing detection model). The object detection model $\mathcal{D}_1$ may generate one or more bounding boxes corresponding to the frame $f_i$ and their scores may be passed to a saliency map generator to build a global saliency map. The global saliency map and a second high-resolution frame $f_{i+1}$ may be passed to the resampling module. The resampling module may generate a down-sampled detail-preserving image of a frame $f_{i+1}'$. The down-sampled image of the frame $f_{i+1}'$ may be provided to a light detection model $\mathcal{D}_2$. Due to the nature of this down-sampled image $f_{i+1}'$, the light detection model $\mathcal{D}_2$ may have similar performance (e.g., accuracy) to the object detection model $\mathcal{D}_1$ at a lower computational cost. For each of the subsequent frames $f_j$, a saliency map may be generated from the detection output of a preceding frame $f_{j-1}$ using the light detection model $\mathcal{D}_2$. In some aspects, to avoid propagating errors over time, the detection output may be updated by periodically or occasionally using the stronger object detection model $\mathcal{D}_1$ (e.g., at every S time steps or frames).

The saliency map generator may be a non-parametric detection-to-mask generator. The saliency map generator may output a map corresponding to salient pixels that may be preserved during resampling. This saliency map (e.g., mask) may be generated from each of the bounding box detections with a score above a threshold $\tau$ of 0.5, for example.

In some aspects, objects with a spatial area that is smaller than 1% of the image area may be assigned a first label of 1 and the objects with a larger area are assigned a label of 0.5. This may enable the resampling module to focus more on preserving the resolution of smaller objects. The background pixels may be labeled as 0. The saliency map may be down-sampled to 128×128 before passing it to the resampling module.

The resampling module may, for example, be based on a thin-plate spline spatial transformer. The resampling module may include i) a localization network, ii) a grid generator, and iii) a sampler.

The localization network may be a convolutional neural network and may, for instance, include eight convolutional layers and two fully connected layers. The localization network may receive the saliency map as input and in turn, may estimate the displacement of a set of N control points (e.g., N=256) defined on a grid (e.g., 16×16) in a Euclidean plane, for example.

The grid generator may be responsible for producing the sampling grid and function as follows. Given a set of control points sampled uniformly on a two-dimensional (2-D) grid $p_i = (x_i, y_j)_{i=1}^{N}$ and the corresponding displacements $v_i = (x_i', y_i')_{i=1}^{N}$ provided by the localization network, a linear system may be solved to derive the parameter W.

$$\underbrace{\begin{bmatrix} w \\ a \end{bmatrix}}_{W} = (\underbrace{\begin{bmatrix} K & P \\ P^T & O \end{bmatrix}}_{L})^{-1} \times \underbrace{\begin{bmatrix} v \\ o \end{bmatrix}}_{V}, \quad (1)$$

where the submatrix P is formed by stacking the control points, the submatrix K is defined as $K_{ij} = U(\|p_i, p_j\|)$, $U(r) = r^2 \log$, V denotes the stacked set of displaced control points, O is a submatrix of zeros, U is the radial basis function and r is the L2 norm between points $p_i, p_j$.

Having estimated the parameter W, a deformation may be applied to a dense uniform grid to obtain a sampling grid G, as follows:

$$G = L' \times W, \quad (2)$$

where L' is computed similarly to L but with dense points.

The sampler may then take the sampling grid G, along with the input image $f_i$ to produce the detail-preserving resampled image $f_i'$.

Learning the parameters of the localization network without explicit guidance on where to magnify may result in inhomogeneous distortions and may not preserve the desired detail. To address this issue, a regularizer may regularize the sampling grid G through a non-parametric attention-based sampling method. This resampling method may receive as input, a saliency map, and may generate a sampling grid that preserves the salient regions in the map. The sampling grid generated may serve as a supervision signal for the sampling module to learn an explicit zooming effect or behavior. However, this approach is non-differentiable, may be computationally expensive, and may generate deformations when multiple objects with various saliency levels appear in the same image. This method decomposes the saliency map into two marginal distributions over x and y axes.

However, this marginalization leads to undesirable distortions for low saliency regions that are located on the same row/column as an object with a higher saliency level. More concretely, if the coordinates (i, j) and (i', j') in the saliency map have high values, the resulting sampling grid may be dense at (i, j) and (i', j'), and at (i, j') and (i', j) regardless of its saliency level. This error can be problematic when there are multiple objects with different saliency levels in the image. While the resampling module is fully differentiable and computationally inexpensive, getting an unmediated supervision may carry the same undesirable artifacts to the sampler. To address this issue, a weighted L2-Loss function may be employed:

$$\text{Loss}_{grid} = M^* \|G - G^2\|_2, \quad (3)$$

where G is the grid generated by the resampling module, G' is the grid generated by the attention-based sampling method, and M is a weighted mask. The weighted mask M may be assigned different values for the small objects ($O_s$), large objects ($O_l$), and background (bg). If the saliency map has small or large objects, the values ($O_s$, $O_l$, bg) may be set to (1, 1, 0.5), or otherwise to (1, 0, 0). Intuitively, when the saliency map is composed of a single saliency level (e.g., multiple small objects), zooming effects may be provided for each of the objects. Thus, full supervision for the entire grid may be provided.

In some aspects, the network model may be trained end-to-end using the detection loss in combination with the $\text{Loss}_{grid}$.

Given the bounding box outputs of the light detection model $\mathcal{D}_2$ for a resampled image, an inverse transformation may be applied to recover the bounding box's coordinates to the original image grid. This may, for example, be achieved by subtracting the grid displacement offset from the bounding box coordinates. As the bounding box coordinates are floating point values, for each bounding box coordinate, an original coordinate may be recovered by linearly interpolating the displacements corresponding to its two closest cells on the deformation grid.

Figure 5:
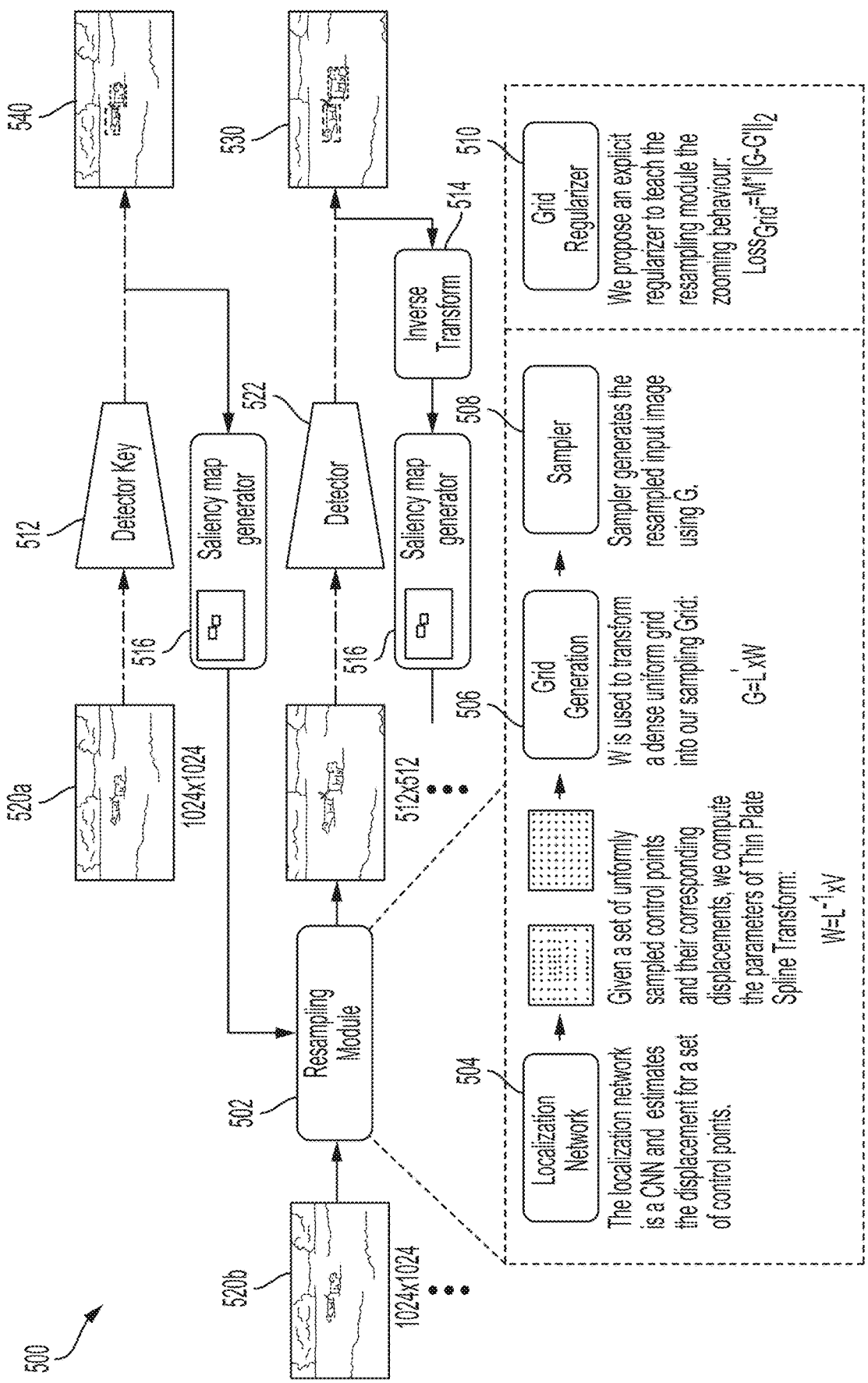
FIG. 5 is a diagram illustrating an example architecture for saliency-based input resampling, in accordance with aspects of the present disclosure.

FIG. 5 is a diagram illustrating an example architecture 500 for saliency-based input resampling, in accordance with aspects of the present disclosure. The example architecture 500 may include a detector key 512, a saliency map generator 516, a resampling module 502, and a detector 522. The architecture 500 may receive a video. The video may include a sequence of N frames (e.g., 520a, 520b), for example. Each frame of the video may include an image. The detector key 512 (e.g., heavy detector $\mathcal{D}_1$) may receive a first frame 520a of a video and generate bounding boxes 540 for one or more objects detected in the first video frame 520a. The bounding box information (e.g., 540) may be supplied to the saliency map generator 516. The saliency map generator 516 may generate a saliency map indicating a position for each of the detected objects (e.g., bounding boxes in which such detected objects may be located). The saliency map may be supplied to the resampling module 502.

The resampling module 502 may include a localization network 504, a grid generator 506, and a sampler 508. The localization network 504 may be a convolutional neural network (e.g., 350 of FIG. 3). The localization network 504 may receive the saliency map as input. The localization network 504 may process the saliency map via successive convolutional layers to extract features of the saliency map. The localization network 504 may generate an estimate of the displacement for a set of control points based on the extracted features of the saliency map. That is, given a set of uniformly sampled control points and their corresponding displacements, parameters of a thin plate spline transform may be computed. The parameters may be supplied to the grid generator 506.

The grid generator 506 may transform a dense uniform grid to a sampling grid based on the computed parameters. The grid generator 506 may output a grid to the sampler 508. The sampler 508 may generate a resampled input frame or image according to the sampling grid.

In some aspects, the resampling module 502 may further include a grid regularizer 510. The resampling module 502 may learn a zooming behavior for zooming in on objects included in the video (indicated in the saliency map), based on the grid regularizer 510.

The resampling module 502 may receive the second frame 520b and a saliency map from the saliency map generator 516. Using the saliency map, the resampling module 502 may down-sample the second frame 520b such that the resolution of smaller objects is preserved while the resolution of the background pixels is more greatly reduced. The resampled second frame may be supplied to the detector 522 (e.g., light detector $D_2$). Having preserved the resolution of the more salient regions of the second frame 520b the detector 522 may generate bounding boxes 530 for one or more objects detected in the second frame 520b. The output of the detector 522 may be supplied to the inverse transform block 514. The inverse transform block 514 transforms the detector 522 output back to the original image grid and supplied the detector 522 output in the original image grid format to the saliency map generator 516.

Figure 6:
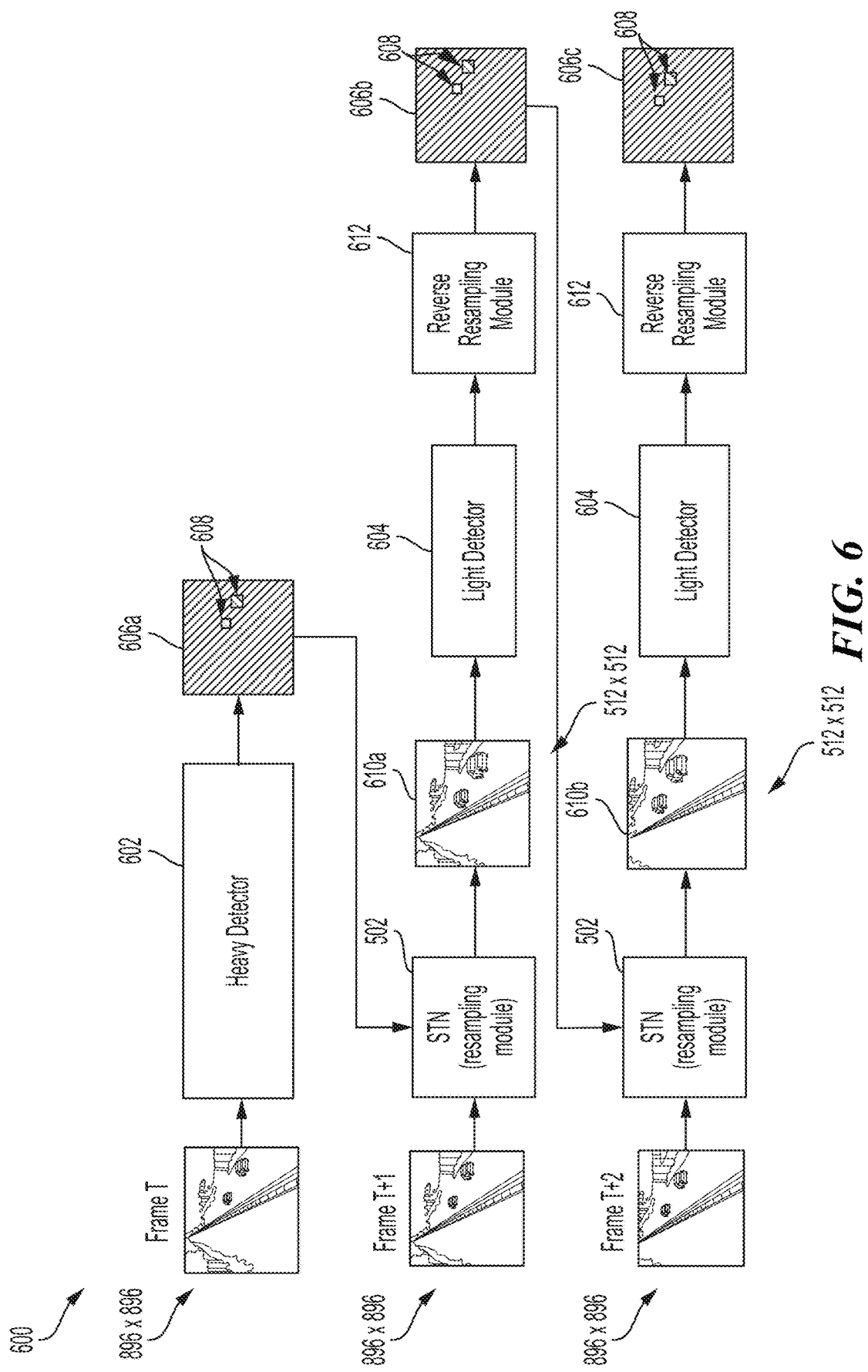
FIG. 6 is a diagram illustration an example implementation of saliency-based resampling of an input, in accordance with aspects of the present disclosure.

FIG. 6 is a diagram illustration an example implementation 600 of saliency-based resampling of an input, in accordance with aspects of the present disclosure. The example implementation may include a heavy detector 602, a light detector 604, and the resampling module 502. The heavy detector 602 and the light detector 604 may each be configured as convolutional neural networks (e.g., 350). The heavy detector 602 may be configured with significantly more memory and processing capacity than the light detector 604, for example.

As shown in FIG. 6, three frames of a video may be received for a video processing task, for instance. Of course, this is merely an example for ease of understanding and not limiting. Rather, any number of images or video frames may be received and processed, in accordance with aspects of the present disclosure. A first video frame, frame T, may be received via the heavy detector 602. Each of the video frames may be high-resolution video frames (e.g., 4K video frames). The heavy detector 602 may process the video frame T and may generate a saliency map 606a. The saliency map 606a may indicate a location of one or more important or salient portions 608 of the image shown in the frame T. For instance, the saliency map 606a may identify a location of an object or a person included in the frame. The saliency map 606a may be supplied to the resampling module 502.

In addition to the saliency map 606a, the resampling module 502 may also receive a next frame, frame T+1, of the video to be processed. The resampling module may sample the video frame T+1 based on the saliency map 606a. For instance, the portions of the frame T+1 corresponding to the salient portions 608 of the saliency map 606a may be sampled at a first resolution and the remainder of the frame T+1 may be sampled at a second resolution that is lower than the first resolution. As shown in FIG. 6, the frame T+1 may, for example, have a resolution of 896×896. On the other hand, a resampled frame T+1 610a may, for example have an overall resolution of the 512×512. However, in comparing the frame T+1 to the resampled frame T+1 610a, the objects depicted in frame T+1 that correspond to salient portions 608 (e.g., the cars) of the saliency map 606a may be a resampled frame at a higher resolution than the remainder of the frame T+1. For example, the cars are shown to be larger in size in the resampled frame T+1 610a than the cars shown in the input frame T+1, to provide a zoomed in effect. By providing the salient regions in higher resolution than the remainder of the image, the accuracy of detecting and classifying such objects is increased, while reducing the computational load associated with processing the frame T+1. Accordingly, the resampled frame T+1 610a may be supplied to the light detector 604 to detect and/or classify the objects in the frame T+1.

Thereafter, such detection information may be supplied to the reverse resampling module 612. The reverse resampling module 612 may be configured symmetrically to the resampling module 502. As such, the reverse resampling module 612 may reverse the resampling process to restore the original resolution of frame T+1 (e.g., 896×896). The reverse resampling module 612 may generate an updated saliency map 606b, which may indicate an updated position of the salient portions 608 (e.g., shown in bounding boxes). In some aspects, the reverse resampling module 612 may determine additional salient portions of the image and include such portions in the updated saliency map 606b.

The updated saliency map 606b and the frame T+2 may be received by the resampling module 502. Frame T+2 may be resampled based on the updated saliency map 606b in a manner similar to that described for frame T+1. A resampled frame T+2 610b may be supplied to the light detector 604, which may again perform an inference task to detect and/or classify one or more objects in the frame T+2 (e.g., the objects at locations of the frame T+2 corresponding to the bounding boxes in the updated saliency map 606b). The detection information may be supplied to the reverse resampling module 612, which may restore the resolution of the original frame T+2 and generate an updated saliency map 606c. Additional frames of the input video may be processed in a similar fashion.

Figure 7:
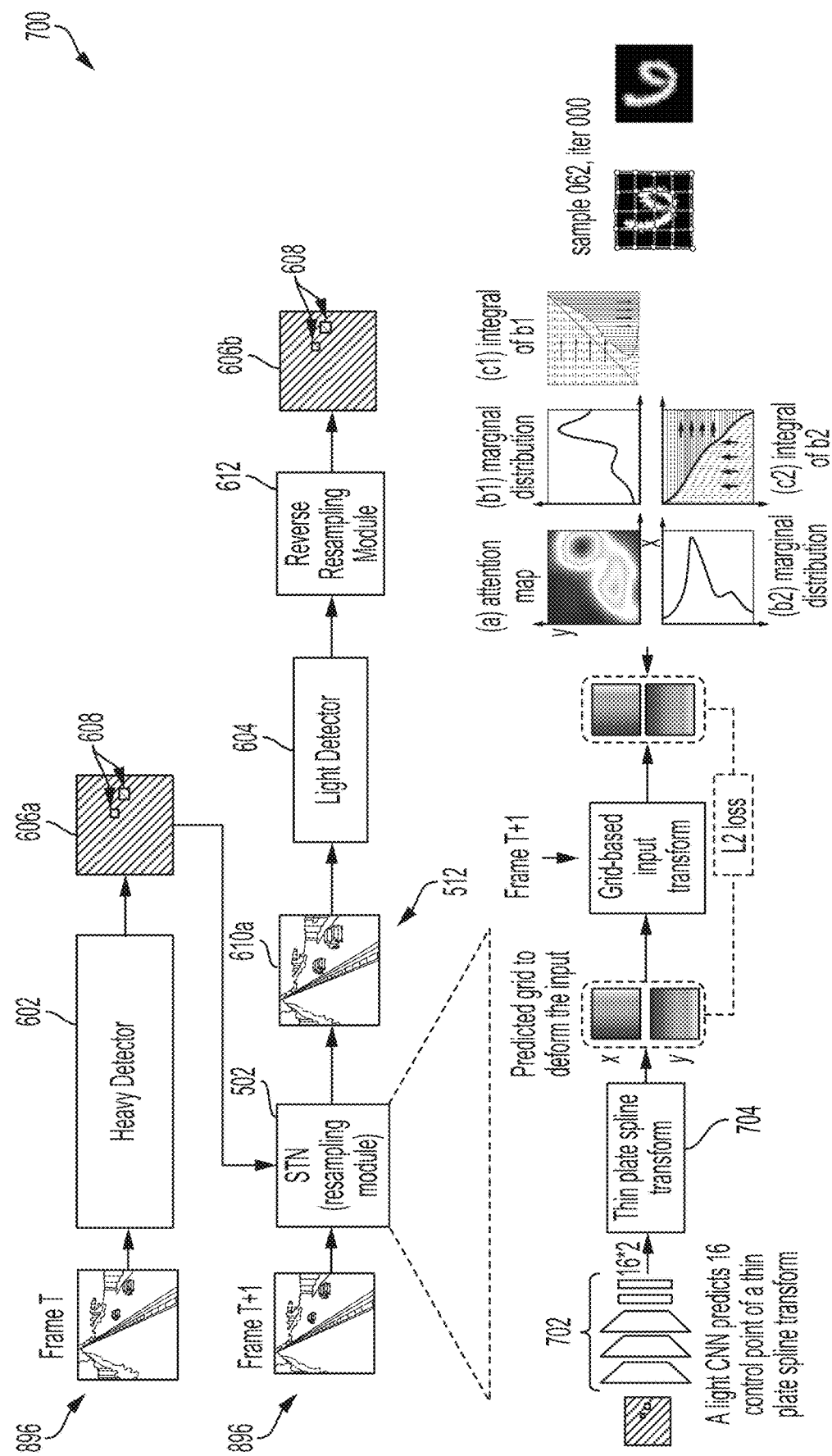
FIG. 7 is a block diagram illustrating an example of implementation and training for the resampling module, in accordance with aspects of the present disclosure.

FIG. 7 is a block diagram illustrating an example of implementation and training 700 for the resampling module 502, in accordance with aspects of the present disclosure. Referring to FIG. 7, the resampling module 502 may include a convolutional neural network 702, which takes as input, a saliency map (e.g., saliency map 606a). In this example implementation, the convolutional neural network 702 may process the saliency map 606a via successive convolutional layers to generate a prediction of control points of a thin plate spline transform 704. Using the control points of the thin plate spline transform 704, a grid may be predicted or determined to deform the input (e.g., video frame). The frame T+1 may be resampled according to the grid-based input transform.

In some aspects, a zoom behavior on the salient objects may be learned according to a trilinear attention mechanism. In some aspects, the resampling module 502 is trained based on the L2 loss given by the object detection loss and the zoom loss.

Figure 8:
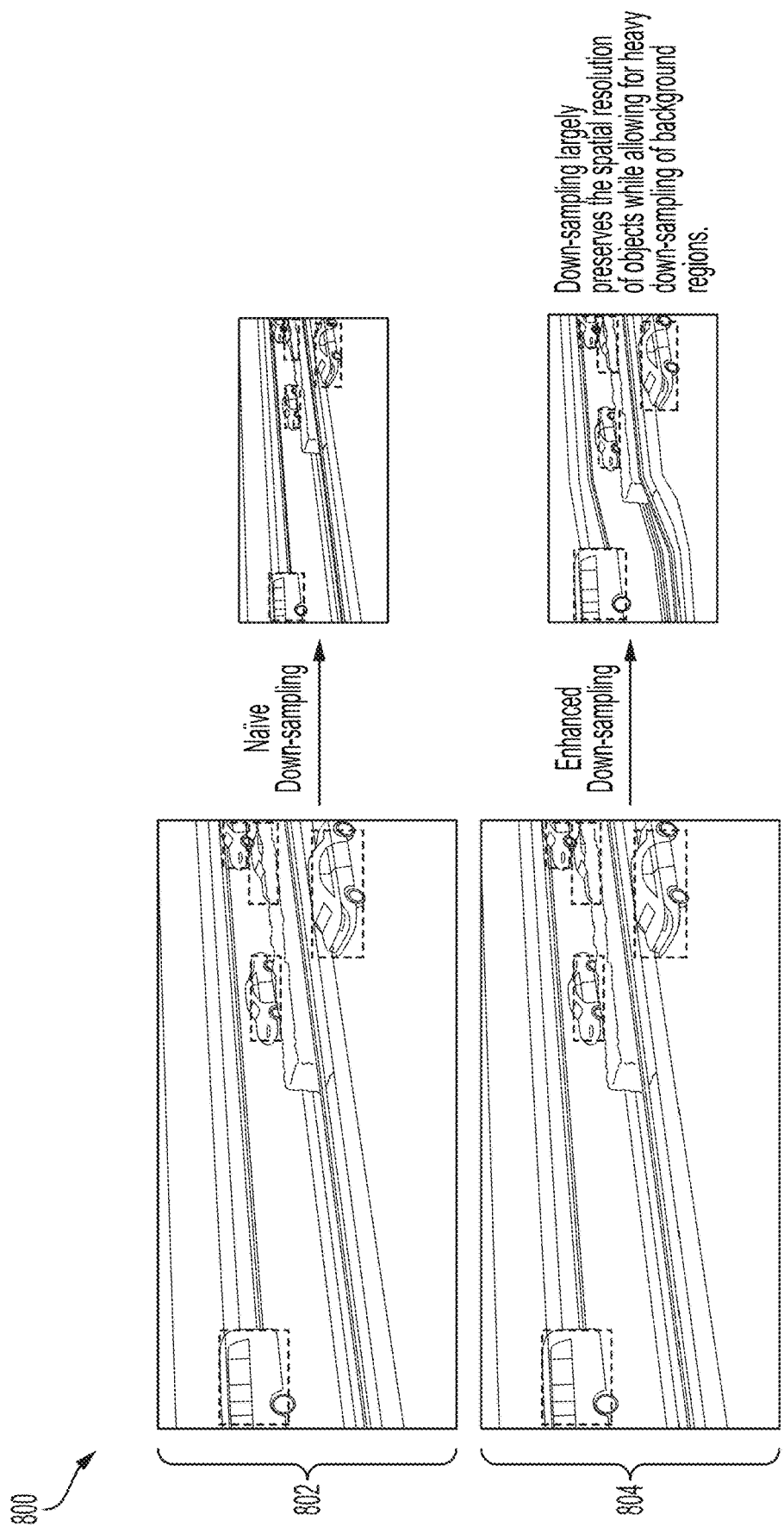
FIG. 8 is a diagram illustrating an example comparison between saliency-based resampling and conventional uniform resampling, in accordance with aspects of the present disclosure.

FIG. 8 is a diagram illustrating an example comparison 800 between saliency-based resampling and conventional uniform resampling, in accordance with aspects of the present disclosure. As shown in FIG. 8, conventional approaches may apply a uniform down-sampling (802) to generate a resampled image. In doing so, important objects as indicated via the bounding boxes are down-sampled equally with all other portions of the input image. Thus, it may be more difficult to detect and classify such objects.

On the other hand, in accordance with aspects of the present disclosure, a resampled input image may be generated based on a saliency map (804). Accordingly, in down-sampling the input, the spatial resolution for objects included in the image (e.g., indicated via the bounding boxes) may be preserved while allowing greater down-sampling of other portions of the image (e.g., background).

Figure 9:
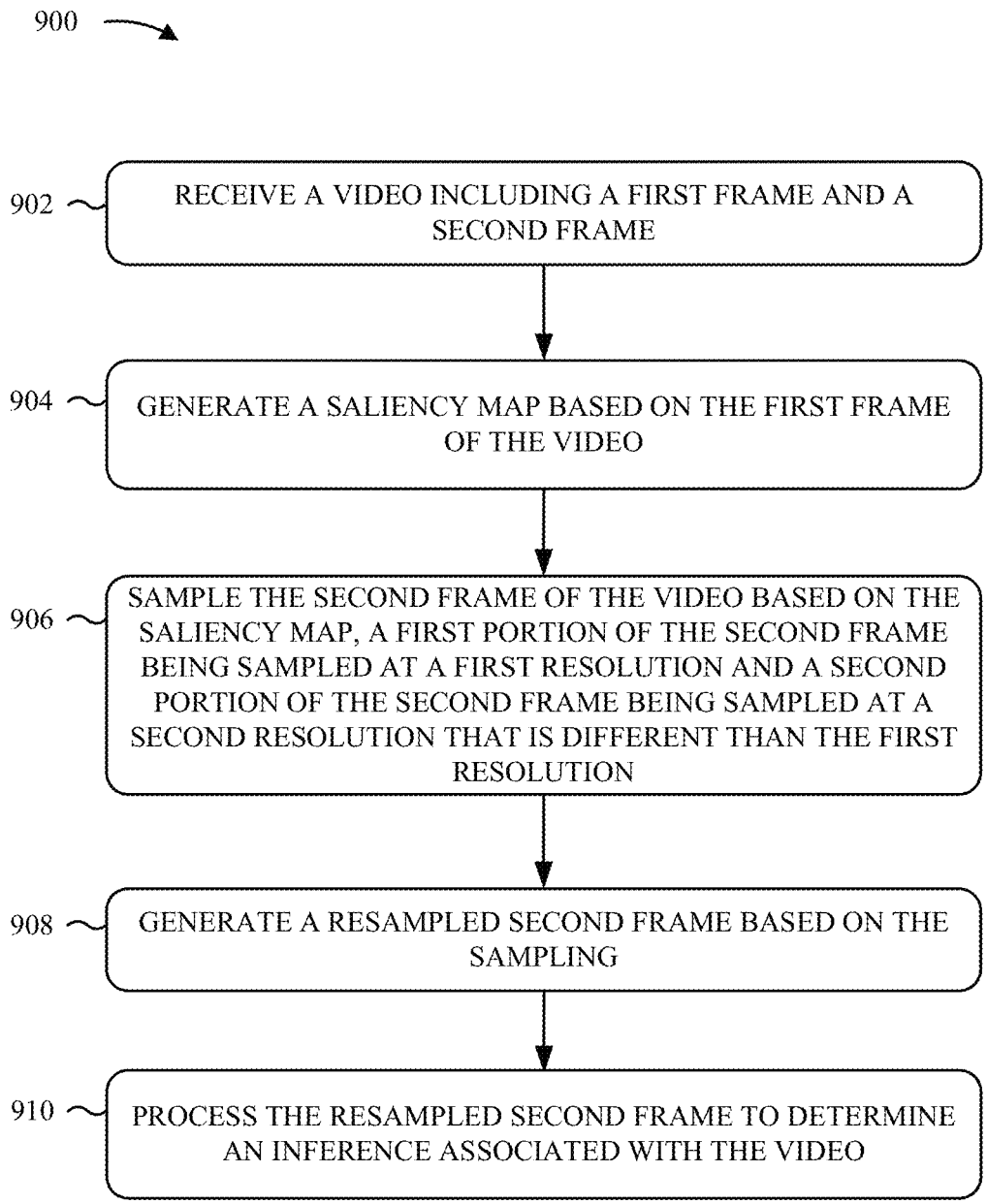
FIG. 9 is a flow diagram illustrating a process for processing a video with an artificial neural network, in accordance with aspects of the present disclosure.

FIG. 9 is a flow diagram illustrating a process 900 for video processing via an artificial neural network, in accordance with aspects of the present disclosure. As shown in FIG. 9, at block 902, the process 900 receives a video including at least a first frame and a second frame. For example, as described with reference to FIG. 5, the architecture 500 may receive a video. The video may include a sequence of N frames (e.g., 520*a*, 520*b*), for example. Each frame (e.g., 520*a*, 520*b*) of the video may include an image. The detector key 512 may receive the first frame 520*a* of the video.

At block 904, the process 900 generates a saliency map based on the first frame of the video. As described with reference to FIG. 5, the detector key 512 may receive the first frame 520*a* of the video and generate bounding boxes 540 for one or more objects detected in the first video frame 520*a*. The bounding box information (e.g., 540) may be supplied to the saliency map generator 516. The saliency map generator 516 may generate a saliency map indicating a position for each of the detected objects (e.g., bounding boxes in which such detected objects may be located).

At block 906, the process 900 samples the second frame of the video based on the saliency map. A first portion of the second frame is sampled at a first resolution and a second portion of the second frame is sampled at a second resolution. The first resolution is different than the second resolution. For instance, as described with reference to FIGS. 5 and 6, the resampling module 502 may also receive a next frame, frame T+1, of the video to be processed. The resampling module may sample the video frame T+1 based on the saliency map 606*a*. For instance, the portions of the frame T+1 corresponding to the salient portions 608 of the saliency map 606*a* may be sampled at a first resolution and the remainder of the frame T+1 may be sampled at a second resolution that is lower than the first resolution.

Additionally, at block 908, the process 900 generates a resampled second frame based on the sampling. As shown in FIG. 6, the process may generate a resample frame T+1 based on the sampling via the resampling module 502. The resampled frame T+1 610*a* may, for example have an overall resolution of the 512×512. However, in comparing the frame T+1 to the resampled frame T+1 610*a*, the objects depicted in frame T+1 that correspond to salient portions 608 (e.g., the cars) of the saliency map 606*a* may be a resampled frame at a higher resolution than the remainder of the frame T+1. For example, the cars are shown to be larger in size in the resampled frame T+1 610*a* than the cars shown in the input frame T+1, to provide a zoomed in effect.

Furthermore, at block 910, the process 900 processes the resampled second frame to determine an inference associated with the video. For example, referring to FIG. 6, the resampled frame T+1 610*a* may be supplied to the light detector 604 to detect and/or classify the objects in the frame T+1. Because the resampled frame T+1 provides the salient regions in higher resolution than the remainder of the image, the accuracy of detecting and classifying such objects is increased, while reducing the computational load associated with processing the frame T+1.

In some aspects, additional frames (e.g., N frames) of the video may be processed. In some examples, the frames may be processed at the second resolution, in which the second resolution is lower than the first resolution. In a second example, the process may periodically or occasionally process a frame of the N frames at the first resolution (e.g., via the heavy detector 602), in which the first resolution is higher than the second. Thereafter, the process may process subsequent frames at a lower resolution (e.g., via the light detector 604) until the next period or occasion occurs.

Implementations examples are provided in the following numbered clauses:

1. A processor-implemented method of video processing using an artificial neural network (ANN), comprising
    receiving a video including a first frame and a second frame;
    generating a saliency map based on the first frame of the video;
    sampling the second frame of the video based on the saliency map, a first portion of the second frame being sampled at a first resolution and a second portion of the second frame being sampled at a second resolution, the first resolution being different than the second resolution;
    generating a resampled second frame based on the sampling; and
    processing the resampled second frame to determine an inference associated with the video.

2. The processor-implemented method of clause 1, in which the first portion corresponds to locations of one of more bounding boxes included in the saliency map.

3. The processor-implemented method of clause 1 or 2, in which the first resolution for the first portion is greater than the second resolution.

4. The processor-implemented method of any of clauses 1-3, further comprising:
    determining displacements for each of a set of control points based on the saliency map;
    transforming a uniform set of grid points to generate a sampling grid based on the displacements for the set of control points; and
    generating the resampled second frame based on the sampling grid.

5. The processor-implemented method of any of clauses 1-4, in which the resampled second frame is generated based on a learned zooming behavior.

6. The processor-implemented method of any of clauses 1-5, further comprising sampling a third portion of the second frame at a third resolution based on the saliency map, the third resolution being different than the first resolution and the second resolution.

7. The processor-implemented method of any of clauses 1-6, in which the ANN includes a first neural network model and a second neural network model, the first neural network model being configured with greater processing capacity than the second neural network model and further comprising:
processing the first frame via the first neural network model; and
processing subsequent frames via the second neural network model.

8. An apparatus for video processing using an artificial neural network (ANN), comprising:
a memory; and
at least one processor coupled to the memory, the at least one processor configured to:
receive a video including a first frame and a second frame;
generate a saliency map based on the first frame of the video;
sample the second frame of the video based on the saliency map, a first portion of the second frame being sampled at a first resolution and a second portion of the second frame being sampled at a second resolution, the first resolution being different than the second resolution;
generate a resampled second frame based on the sampling; and
process the resampled second frame to determine an inference associated
with the video.

9. The apparatus of clause 8, in which the first portion corresponds to locations of one of more bounding boxes included in the saliency map.

10. The apparatus of clause 8 or 9, in which the first resolution for the first portion is greater than the second resolution.

11. The apparatus of any of clauses 8-10, in which the at least one processor is further configured to:
determine displacements for each of a set of control points based on the saliency map;
transform a uniform set of grid points to generate a sampling grid based on the displacements for the set of control points; and
generate the resampled second frame based on the sampling grid.

12. The apparatus of any of clauses 8-11, in which the at least one processor is further configured to generate the resampled second frame based on a learned zooming behavior.

13. The apparatus of any of clauses 8-12, in which the at least one processor is further configured to sample a third portion of the second frame at a third resolution based on the saliency map, the third resolution being different than the first resolution and the second resolution.

14. The apparatus of any of clauses 8-13, in which the ANN includes a first neural network model and a second neural network model, the first neural network model being configured with greater processing capacity than the second neural network model and the at least one processor is further configured to:
process the first frame via the first neural network model; and
process subsequent frames via the second neural network model.

15. A non-transitory computer-readable medium having program code recorded thereon for video processing using an artificial neural network (ANN), the program code being executed by a processor and comprising:
program code to receive a video including a first frame and a second frame;
program code to generate a saliency map based on the first frame of the video;
program code to sample the second frame of the video based on the saliency map, a first portion of the second frame being sampled at a first resolution and a second portion of the second frame being sampled at a second resolution, the first resolution being different than the second resolution;
program code to generate a resampled second frame based on the sampling; and
program code to process the resampled second frame to determine an inference associated with the video.

16. The non-transitory computer-readable medium of clause 15, in which the first portion corresponds to locations of one of more bounding boxes included in the saliency map.

17. The non-transitory computer-readable medium of clause 15 or 16, in which the first resolution for the first portion is greater than the second resolution.

18. The non-transitory computer-readable medium of any of clauses 15-17, further comprising:
program code to determine displacements for each of a set of control points based on the saliency map;
program code to transform a uniform set of grid points to generate a sampling grid based on the displacements for the set of control points; and
program code to generate the resampled second frame based on the sampling grid.

19. The non-transitory computer-readable medium of any of clauses 15-18, further comprising program code to generate the resampled second frame based on a learned zooming behavior.

20. The non-transitory computer-readable medium of any of clauses 15-19, further comprising program code to sample a third portion of the second frame at a third resolution based on the saliency map, the third resolution being different than the first resolution and the second resolution.

21. The non-transitory computer-readable medium of any of clauses 15-20, in which the ANN includes a first neural network model and a second neural network model, the first neural network model being configured with greater processing capacity than the second neural network model and further comprising:
program code to process the first frame via the first neural network model; and
program code to process subsequent frames via the second neural network model.

22. An apparatus for video processing using an artificial neural network (ANN), comprising:
means for receiving a video including a first frame and a second frame;
means for generating a saliency map based on the first frame of the video;
means for sampling the second frame of the video based on the saliency map, a first portion of the second frame being sampled at a first resolution and a second portion of the second frame being sampled at a second resolution, the first resolution being different than the second resolution;
means for generating a resampled second frame based on the sampling; and means for processing the resampled second frame to determine an inference associated with the video.

23. The apparatus of clause 22, in which the first portion corresponds to locations of one of more bounding boxes included in the saliency map.

24. The apparatus of clause 22 or 23, in which the first resolution for the first portion is greater than the second resolution.

25. The apparatus of any of clauses 22-24, further comprising:
   means for determining displacements for each of a set of control points based on the saliency map;
   means for transforming a uniform set of grid points to generate a sampling grid based on the displacements for the set of control points; and
   means for generating the resampled second frame based on the sampling grid.

26. The apparatus of any of clauses 22-25, further comprising means for generating the resampled second frame based on a learned zooming behavior.

27. The apparatus of any of clauses 22-26, further comprising means for sampling a third portion of the second frame at a third resolution based on the saliency map, the third resolution being different than the first resolution and the second resolution.

28. The apparatus of any of clauses 22-27, in which the ANN includes a first neural network model and a second neural network model, the first neural network model being configured with greater processing capacity than the second neural network model and further comprising:
   processing the first frame via the first neural network model; and
   processing subsequent frames via the second neural network model.

In one aspect, the receiving means, means for generating a saliency map, sampling means, means for generating a resampled second frame, and/or processing means may be the CPU 102, program memory associated with the CPU 102, the dedicated memory block 118, fully connected layers 362, NPU 428, and/or the routing connection processing unit 216 configured to perform the functions recited. In another configuration, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described. For certain aspects, the computer program product may include packaging material.

Further, it should be appreciated that modules and/or other appropriate means for performing the methods and techniques described can be downloaded and/or otherwise obtained by a user terminal and/or base station as applicable. For example, such a device can be coupled to a server to facilitate the transfer of means for performing the methods described. Alternatively, various methods described can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A processor-implemented method of video processing using an artificial neural network (ANN), comprising
receiving a video including a first frame and a second frame;
processing the first frame with a first neural network model;
generating a saliency map based on the first frame of the video;
sampling the second frame of the video based on the saliency map, a first portion of the second frame being sampled at a first resolution and a second portion of the second frame being sampled at a second resolution, the first resolution being different than the second resolution;
generating a resampled second frame based on the sampling; and
processing the resampled second frame with a second neural network model to determine an inference associated with the video, wherein the second neural network model is configured with less processing capacity than the first neural network model.

2. The processor-implemented method of claim 1, in which the first portion corresponds to locations of one of more bounding boxes included in the saliency map.

3. The processor-implemented method of claim 2, in which the first resolution for the first portion is greater than the second resolution.

4. The processor-implemented method of claim 1, further comprising:
determining displacements for each of a set of control points based on the saliency map;
transforming a uniform set of grid points to generate a sampling grid based on the displacements for the set of control points; and
generating the resampled second frame based on the sampling grid.

5. The processor-implemented method of claim 4, in which the resampled second frame is generated based on a learned zooming behavior.

6. The processor-implemented method of claim 1, further comprising sampling a third portion of the second frame at a third resolution based on the saliency map, the third resolution being different than the first resolution and the second resolution.

7. An apparatus for video processing using an artificial neural network (ANN), comprising:
a memory; and
at least one processor coupled to the memory, the at least one processor configured to:
receive a video including a first frame and a second frame;
process the first frame with a first neural network model;
generate a saliency map based on the first frame of the video;
sample the second frame of the video based on the saliency map, a first portion of the second frame being sampled at a first resolution and a second portion of the second frame being sampled at a second resolution, the first resolution being different than the second resolution;
generate a resampled second frame based on the sampling; and
process the resampled second frame with a second neural network model to determine an inference associated with the video, wherein the second neural network model is configured with less processing capacity than the first neural network model.

8. The apparatus of claim 7, in which the first portion corresponds to locations of one of more bounding boxes included in the saliency map.

9. The apparatus of claim 8, in which the first resolution for the first portion is greater than the second resolution.

10. The apparatus of claim 7, in which the at least one processor is further configured to:
determine displacements for each of a set of control points based on the saliency map;
transform a uniform set of grid points to generate a sampling grid based on the displacements for the set of control points; and
generate the resampled second frame based on the sampling grid.

11. The apparatus of claim 10, in which the at least one processor is further configured to generate the resampled second frame based on a learned zooming behavior.

12. The apparatus of claim 7, in which the at least one processor is further configured to sample a third portion of the second frame at a third resolution based on the saliency map, the third resolution being different than the first resolution and the second resolution.

13. A non-transitory computer-readable medium having program code recorded thereon for video processing using an artificial neural network (ANN), the program code being executed by a processor and comprising:
program code to receive a video including a first frame and a second frame;
program code to process the first frame with a first neural network model;
program code to generate a saliency map based on the first frame of the video;
program code to sample the second frame of the video based on the saliency map, a first portion of the second frame being sampled at a first resolution and a second portion of the second frame being sampled at a second resolution, the first resolution being different than the second resolution;
program code to generate a resampled second frame based on the sampling; and
program code to process the resampled second frame with a second neural network model to determine an inference associated with the video, wherein the second neural network model is configured with less processing capacity than the first neural network model.

14. The non-transitory computer-readable medium of claim 13, in which the first portion corresponds to locations of one of more bounding boxes included in the saliency map.

15. The non-transitory computer-readable medium of claim 14, in which the first resolution for the first portion is greater than the second resolution.

16. The non-transitory computer-readable medium of claim 13, further comprising:
program code to determine displacements for each of a set of control points based on the saliency map;
program code to transform a uniform set of grid points to generate a sampling grid based on the displacements for the set of control points; and
program code to generate the resampled second frame based on the sampling grid.

17. The non-transitory computer-readable medium of claim 16, further comprising program code to generate the resampled second frame based on a learned zooming behavior.

18. The non-transitory computer-readable medium of claim 13, further comprising program code to sample a third portion of the second frame at a third resolution based on the saliency map, the third resolution being different than the first resolution and the second resolution.

* * * * *